United States Patent
Yabuguchi et al.

(10) Patent No.: US 7,831,356 B2
(45) Date of Patent: Nov. 9, 2010

(54) ELECTRIC POWER STEERING CONTROL APPARATUS

(75) Inventors: Michisada Yabuguchi, Kasugai (JP); Shinichi Kuratani, Kasugai (JP); Masamitsu Hamasaki, Kasugai (JP)

(73) Assignee: OMRON Corporation, Kyoto (JP)

( * ) Notice: Subject to any disclaimer, the term of this patent is extended or adjusted under 35 U.S.C. 154(b) by 652 days.

(21) Appl. No.: 11/895,130

(22) Filed: Aug. 23, 2007

(65) Prior Publication Data

US 2008/0066995 A1    Mar. 20, 2008

(30) Foreign Application Priority Data

Sep. 14, 2006 (JP) .............................. 2006-249790

(51) Int. Cl.
  B62D 5/04    (2006.01)
  B62D 6/00    (2006.01)
  H02P 7/06    (2006.01)
(52) U.S. Cl. ............................. 701/41; 701/42; 180/446
(58) Field of Classification Search .................. None
  See application file for complete search history.

(56) References Cited

U.S. PATENT DOCUMENTS

| | | | |
|---|---|---|---|
| 5,740,880 A * | 4/1998 | Miller | 180/446 |
| 6,427,104 B1 | 7/2002 | Matsushita et al. | |
| 6,608,457 B2 | 8/2003 | Kogiso | |
| 7,188,702 B2 | 3/2007 | Takagi et al. | |
| 2002/0060106 A1 | 5/2002 | Kogiso | |
| 2007/0103105 A1 | 5/2007 | Endo et al. | |

FOREIGN PATENT DOCUMENTS

| | | |
|---|---|---|
| GB | 0 778 660 A2 | 6/1997 |
| JP | 2002-145096 A | 5/2002 |
| JP | 2003-040128 A | 2/2003 |
| JP | 2004-040883 A | 2/2004 |
| JP | 2005-145342 A | 6/2005 |
| JP | 1 698 541 A1 | 9/2006 |

OTHER PUBLICATIONS

Extended European Search Report for Application No. 07112212.1-2423/1900605, dated Aug. 4, 2010, (7 pages).

* cited by examiner

Primary Examiner—Michael J. Zanelli
(74) Attorney, Agent, or Firm—Osha • Liang LLP

(57) ABSTRACT

An electric power steering control apparatus for controlling a motor that provides an assisting force for steering a steering wheel has a command value calculation device operable to calculate a command value for a torque current to be fed to the motor based on a steering torque of the steering wheel, a magnetic field control device operable to control intensity of a magnetic field in the motor, and a motor drive device operable to drive the motor based on outputs from the command value calculation device and the magnetic field control device. The magnetic field control device is operable to perform a field weakening control for weakening the magnetic field in the motor when a vehicle speed is less than a predetermined value, and to not perform the field weakening control when the vehicle speed is not less than the predetermined value.

3 Claims, 12 Drawing Sheets

Field weakening control unit

Field weakening control unit

Field weakening control unit

PRIOR ART

PRIOR ART

PRIOR ART

ELECTRIC POWER STEERING CONTROL APPARATUS

BACKGROUND OF THE INVENTION

1. Field of the Invention

The present invention relates to an electric power steering control apparatus mounted on vehicles. In particular, the present invention relates to a field weakening control technique for improving an output from a motor.

2. Description of the Related Art

A typical electric power steering apparatus provides an assisting force (steering assisting force) by means of an electric motor when a driver steers a steering wheel of a vehicle. FIG. 11 shows a diagram illustrating a system configuration of an example of the electric power steering apparatus. In this figure, a reference numeral 14 indicates an electric motor that generates an assisting force, and such as a brushless motor is used as this electric motor. A reference numeral 13 indicates a current sensor that senses current flowing through the motor 14, and a reference numeral 15 indicates an angle sensor that senses a rotational angle of the motor 14. A reference numeral 20 indicates a steering wheel provided in front of a driving seat in a vehicle, a reference numeral 21 indicates a shaft one end of which is coupled to the steering wheel 20, a reference numeral 22 indicates a torque sensor that senses a torque applied to the shaft 21 when steering, and a reference numeral 23 indicates a gearing mechanism which is coupled to the other end of the shaft 21. A reference numeral 25 indicates a transmission mechanism that transmits a steering force of the steering wheel 20 and an assisting force of the motor 14 to a wheel 26 via a gearing mechanism 23. A reference numeral 28 indicates a vehicle speed sensor that senses a drive speed of the vehicle. A reference numeral 29 indicates a battery that supplies power voltage for driving the motor 14, a reference numeral 30 indicates a booster circuit that boots the voltage of the battery 29, and a reference numeral 31 indicates a controller constituted by an electronic control unit (ECU) that controls the motor 14.

Upon steering of the steering wheel 20, a torque generated at the shaft 21 due to the steering is detected by the torque sensor 22. A command value for current to be fed to the motor 14 is calculated by the controller 31 based on a value for the torque and a value for vehicle speed detected by the vehicle speed sensor 28. Then, current is supplied from a motor driving circuit incorporated in the controller 31 to the motor 14 based on the command value for current, and the motor 14 is rotated to generate the assisting force for steering the steering wheel 20. The current that flows through the motor 14 is detected by a current sensor 13, and a rotational angle of the motor 14 is detected by an angle sensor 15. These detected values are inputted to the controller 31. The controller 31 performs a feedback control so that a value for the current that flows through the motor 14 is equal to the command value.

FIG. 12 shows a graph indicating general characteristics of the motor in the electric power steering apparatus. As can be seen from the drawing, a rotating speed and a torque of the motor are conflicting, and the torque decreases as the rotating speed increases, and the torque increases as the rotating speed decreases. When the torque decreases, the steering wheel cannot be handled smoothly because the assisting force is not sufficient. When the rotating speed decreases, steering response deteriorates. Either case leads to unfavorable steering feeling.

Output characteristics required for a motor vary depending on a driving state of a vehicle. For example, because friction between a wheel and a road surface is small when the vehicle drives normally, the assisting force required for the steering is not very large. On the other hand, the friction between the wheel and the road surface is large when the vehicle is parked, and accordingly, the assisting force required for the steering is greater.

With a motor having properties as shown in FIG. 12, when steering while the vehicle is parked, only a torque Tb can be obtained where the torque required for assisting the steering for a motor rotating speed Nb is Ta. Thus, an output from the motor is insufficient and the assisting force required for the steering cannot be obtained, and handling of the steering wheel is not smooth. The same can be applied when the vehicle drives very slowly. On the other hand, when steering while the vehicle drives normally, only a rotating speed Nb can be obtained where a rotating speed necessary to ensure steering response for the torque Tb is Na. Thus, an output from the motor is also insufficient and a favorable steering response cannot be obtained.

An application of field weakening control has been proposed for weakening a magnetic field of the motor in a small region of the torque (see Japanese Patent Application Laid-Open No. 2002-145096, Japanese Patent Application Laid-Open No. 2003-40128, Japanese Patent Application Laid-Open No. 2004-40883, and Japanese Patent Application Laid-Open No. 2005-145342, for example). FIG. 13 shows an example of the characteristics of the motor when a field weakening control is applied. In the field weakening control, controlling field current weakens a magnetic field flux of the motor to decrease a back electromotive force, thereby improving an output of the motor. As a result shown in FIG. 13, the torque for the rotating speed Nb in the region where the field weakening control is performed is greater than a case without the field weakening control (Tb→Ta), and the rotating speed for the torque Tb in the region where the field weakening control is performed is greater than a case without the field weakening control (Nb→Na). Consequently, it is possible to obtain a required torque Ta to secure a sufficient assisting force when steering while the vehicle is parked, and it is possible to obtain a required rotating speed Na to provide a sufficient steering response when steering while the vehicle is driving.

However, when performing the field weakening control, the region in which the magnetic field is weakened fails to demonstrate linear characteristics as shown in FIG. 13 in practice, and demonstrates nonlinear characteristics as shown in FIG. 14. When the field weakening control makes the characteristics of the motor nonlinear as described above, it is not possible to realize a linear control and to obtain an output from the motor according to the command value. As a result, the steering feeling when steering while driving deteriorates.

SUMMARY OF THE INVENTION

In one or more embodiments of the present invention, an electric power steering control apparatus is capable of providing an assisting force required for steering when a vehicle is parked or drives at a low speed while maintaining favorable steering feeling.

One or more embodiments of the present invention provides an electric power steering control apparatus controlling a motor that provides an assisting force for steering a steering wheel, and the apparatus includes: a command value calculation device operable to calculate a command value for a torque current to be fed to the motor based on a steering torque of the steering wheel; a magnetic field control device operable to control intensity of a magnetic field in the motor; and a motor drive device operable to drive the motor based on outputs from the command value calculation device and the magnetic field control device, wherein the magnetic field control device performs a field weakening control for weakening the magnetic field in the motor when a vehicle speed is less than a predetermined value, and fails to perform the field weakening control when the vehicle speed is not less than the predetermined value.

With such a configuration, the field weakening control is performed only when the vehicle speed is less than the predetermined value, and the field weakening control is not performed when the vehicle speed is not less than the predetermined value. Consequently, linear motor characteristics can be maintained for steering while the vehicle is driving, and it is possible to obtain a motor output according to a command value. Thus, it is possible to prevent steering feeling from being deteriorated when steering while the vehicle is driving. On the other hand, the field weakening control works when the vehicle is parked or driving very slowly and a necessary torque can be obtained, thereby providing a sufficient assisting force.

In one or more embodiments of the present invention, the command value calculation device calculates an assisting amount corresponding to the steering torque based on the steering torque of the steering wheel and calculates a differential value of the steering torque, and adds the assisting amount and the differential value to output as the command value for torque current. In this case, the magnetic field control device outputs a field weakening command value based on the torque current command value outputted from the command value calculation device and a rotating speed of the motor when the vehicle speed is less than the predetermined value, and fails to output the field weakening command value when the vehicle speed is not less than the predetermined value, the field weakening command value being for performing the field weakening control.

Further, in one or more embodiments of the present invention, the magnetic field control device can be configured to include: a determination device operable to determine whether or not the vehicle speed is less than the predetermined value; a calculation device operable to compute a field weakening command value based on the torque current command value calculated by the command value calculation device and a rotating speed of the motor, the field weakening command value being for performing the field weakening control; and an output switching device operable to switch between outputting the field weakening command value calculated by the calculation device when the determination device determines that the vehicle speed is less than the predetermined value, and failing to output the field weakening command value calculated by the calculation device when the determination device determines that the vehicle speed is not less than the predetermined value.

According to one or more embodiments of the present invention, the field weakening control is performed only when the vehicle speed is less than the predetermined value. Thus, it is possible to maintain favorable steering feeling as well as to provide an assisting force required for steering when the vehicle is parked or drives at a low speed.

DETAILED DESCRIPTION OF THE PREFERRED EMBODIMENTS

Figure 1:
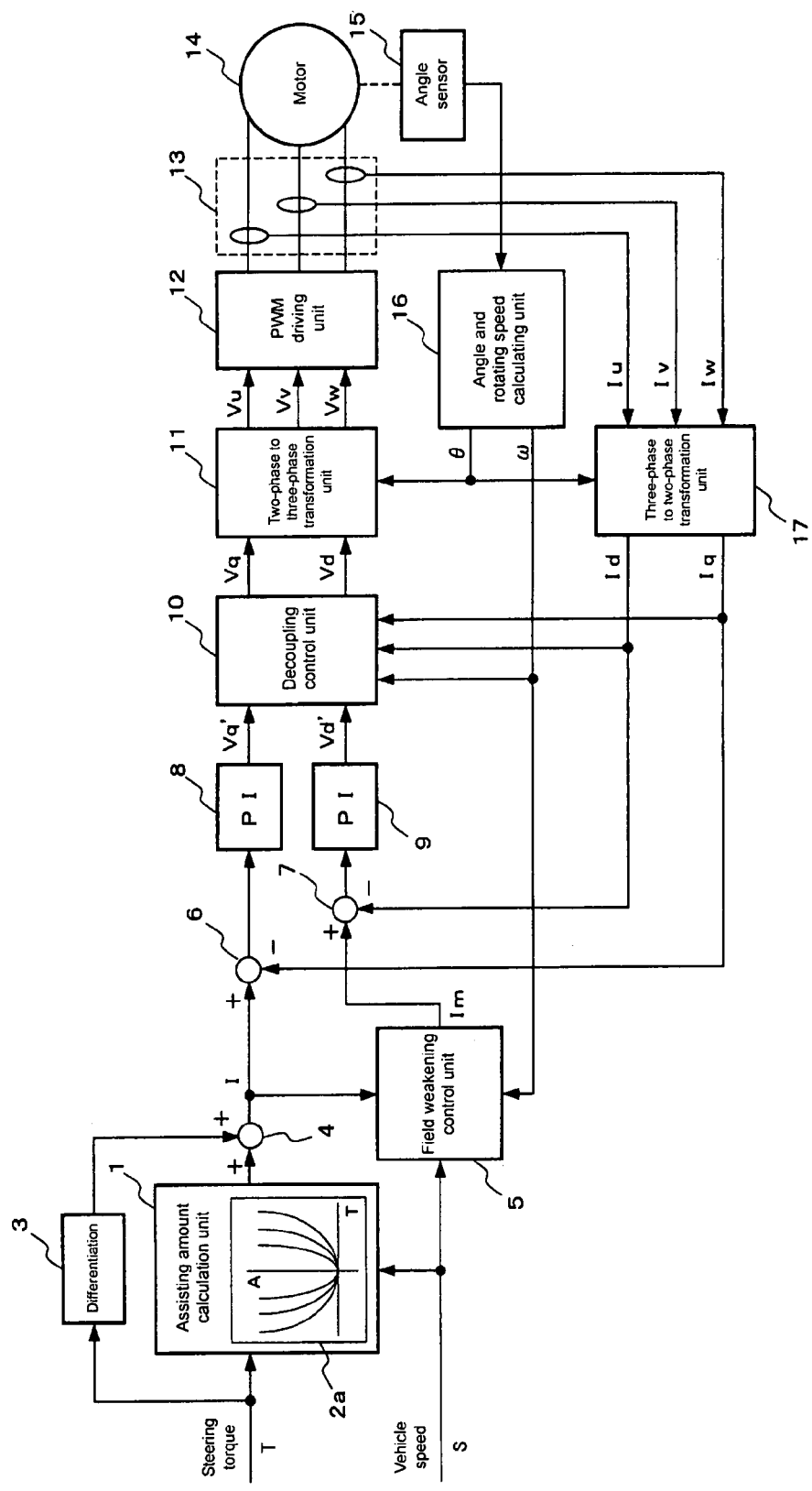
FIG. 1 shows a block diagram of an electric power steering control apparatus according to an embodiment of the present invention.

FIG. 1 shows a block diagram of an electric power steering control apparatus according to an embodiment of the present invention. In this figure, only components that relate to one or more embodiments of the present invention are shown. The electric power steering control apparatus is configured by the components other than a motor 14. The system configuration is similar to that shown in FIG. 11.

Figure 2:
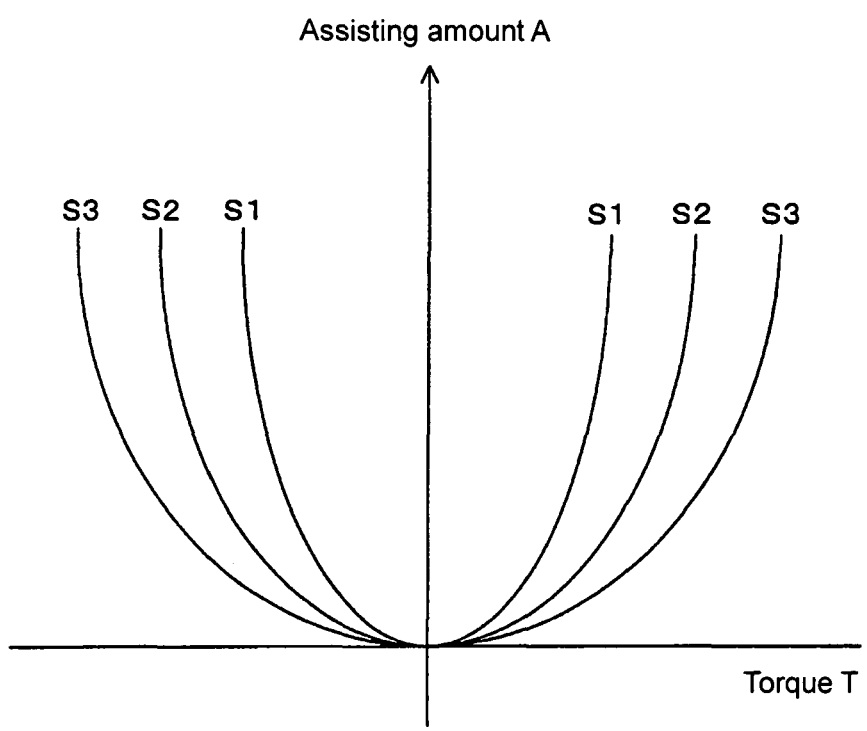
FIG. 2 shows a diagram illustrating a table for an amount of assisting force.
Figure 11:
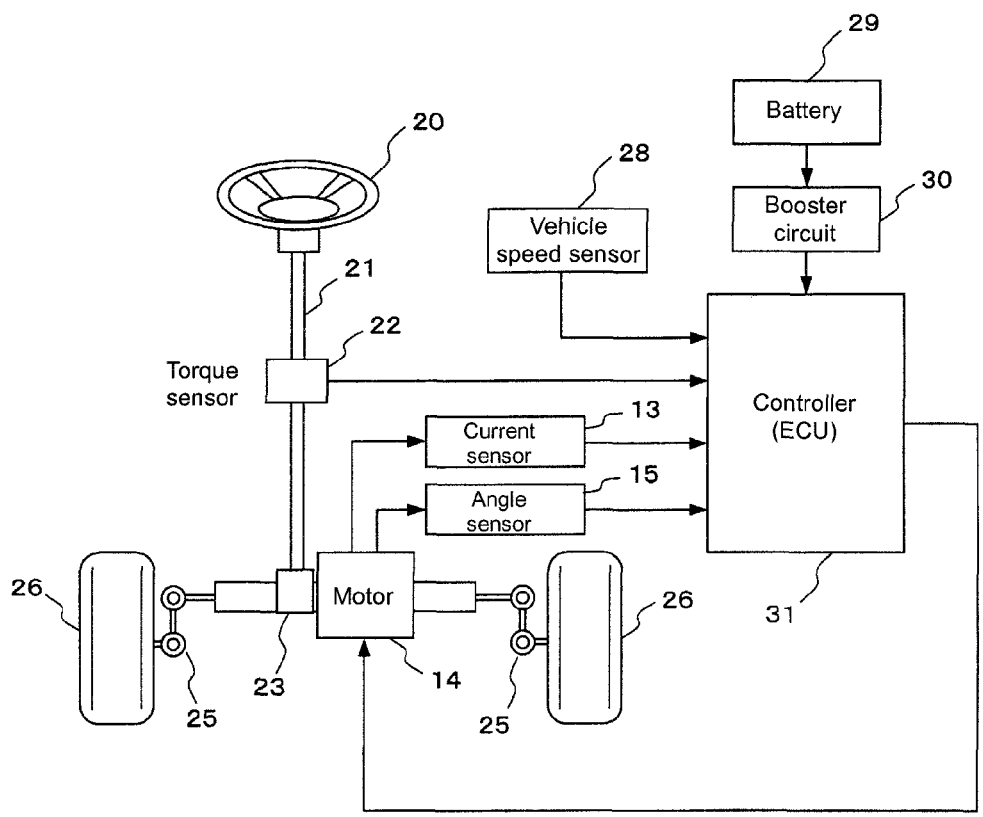
FIG. 11 shows a diagram illustrating a system configuration of an example of the electric power steering apparatus.
Figure 12:
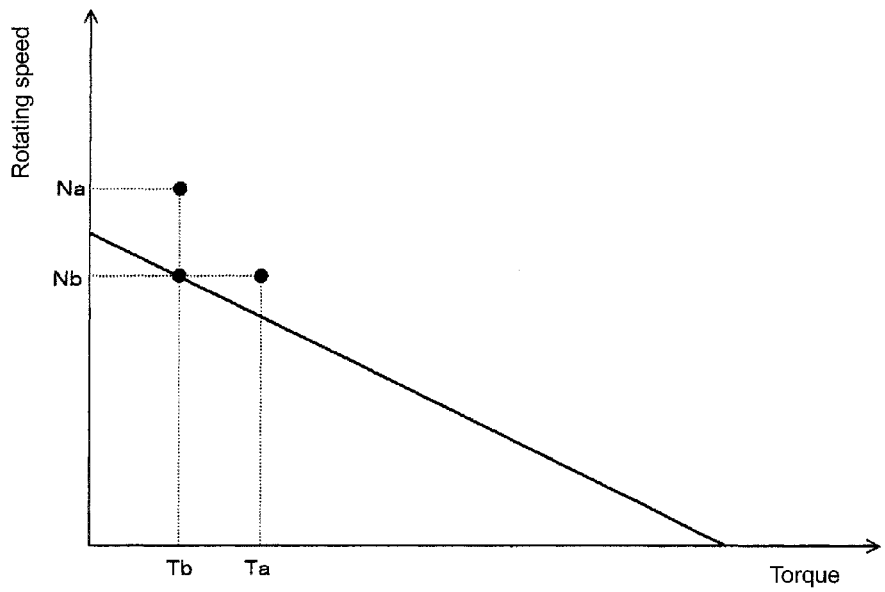
FIG. 12 shows a graph indicating general characteristics of a motor in the electric power steering apparatus.

A reference numeral 1 indicates an assisting amount calculation unit that calculates an amount of assisting force required for assisting steering of a vehicle, and includes an assisting amount table 2a. As shown in FIG. 2, the assisting amount table 2a is to store assisting amounts corresponding to torques, taking vehicle speeds S1, S2, and S3 as parameters. The assisting amount calculation unit 1 calculates an assisting amount A corresponding to the steering torque T with reference to the assisting amount table 2a based on a steering torque T of a steering wheel 20 detected by a torque sensor 22 (FIG. 11) and a vehicle speed S detected by a vehicle speed sensor 28 (FIG. 11). A reference numeral 3 indicates a differentiating circuit that calculates a differential value of the steering torque T (rate of change of the torque over time), and a reference numeral 4 indicates a computing unit that adds the assisting amount A calculated by the assisting amount calculation unit 1 and the differential value of the steering torque T calculated by the differentiating circuit 3. The computing unit 4 outputs a result of the addition as a command value I for torque current. The command value I for torque current is expressed as follows.

$$I = A + (dT/dt) \quad (1)$$

A reference numeral 5 indicates a field weakening control unit that controls an intensity of a magnetic field in the motor 14 to weaken the magnetic field under a predetermined condition. The field weakening control unit 5 will be described later in detail. A reference numeral 6 indicates a computing unit that calculates a deviation of the command value I for torque current as an output from the computing unit 4 and a q-axis current Iq that is fed back from a three-phase to two-phase transformation unit 17 that is described later. A reference numeral 7 indicates a computing unit that calculates a deviation of a field weakening command value Im outputted from the field weakening control unit 5 and a d-axis current Id that is fed back from the three-phase to two-phase transformation unit 17. A reference numeral 8 indicates a proportional integral circuit that generates a q-axis voltage Vq' corresponding to the deviation calculated by the computing unit 6, and a reference numeral 9 indicates a proportional integral circuit that generates a d-axis voltage Vd' corresponding to the deviation calculated by the computing unit 7. A reference numeral 10 indicates a decoupling control unit to eliminate interferences between an amount of handling a q axis and an amount of controlling a d axis, and between an amount of handling the d axis and an amount of controlling the q axis. The decoupling control unit 10 outputs a q-axis voltage Vq and a d-axis voltage Vd that have been corrected. Values for Vq and Vd are calculated by equations as follows.

$$Vq = Vq' + \omega \cdot (\phi + L \cdot Id)$$

$$Vd = Vd' - \omega \cdot L \cdot Iq$$

Here, $\omega$ represents a motor rotating speed, $\phi$ represents an interlinkage magnetic flux of an armature coil, and L represents an inductance of the coil.

A reference numeral 11 indicates a two-phase to three-phase transformation unit that transforms the q-axis voltage Vq and the d-axis voltage Vd into three-phase voltage command values Vu, Vv, and Vw. Values for Vu, Vv, and Vw are calculated by equations as follows.

$$Vu = \sqrt{\frac{2}{3}} \ (\cos(\theta) \cdot Vd - \sin(\theta) \cdot Vq) \quad \text{[Equation 1]}$$

$$Vv = \sqrt{\frac{2}{3}} \ \left(\cos\left(\theta - \frac{2}{3}\pi\right) \cdot Vd - \sin\left(\theta - \frac{2}{3}\pi\right) \cdot Vq\right)$$

$$Vw = \sqrt{\frac{2}{3}} \ \left(\cos\left(\theta + \frac{2}{3}\pi\right) \cdot Vd - \sin\left(\theta + \frac{2}{3}\pi\right) \cdot Vq\right)$$

Here, $\theta$ represents a rotational angle of the motor 14 calculated by an angle and rotating speed calculating unit 16 that will be described later.

A reference numeral 12 indicates a PWM (Pulse Width Modulation) driving unit that generates a PWM voltage with a predetermined duty cycle for each phase based on the voltage command values Vu, Vv, and Vw outputted from the two-phase to three-phase transformation unit, and supplies the generated PWM voltage to the motor 14. A reference numeral 13 indicates a current sensor that detects currents Iu, Iv, and Iw that flow through corresponding phases of the motor 14. A reference numeral 15 indicates an angle sensor that detects the rotational angle of the motor 14. As the angle sensor 15, such as a hall IC, a resolver, or a rotary encoder can be employed. A reference numeral 16 indicates the angle and rotating speed calculating unit that calculates the rotational angle $\theta$ and the rotating speed $\omega$ of the motor 14 based on an output from the angle sensor 15.

A reference numeral 17 indicates a three-phase to two-phase transformation unit that transforms the currents Iu, Iv, and Iw for corresponding phases that has been detected by the current sensor 13 into two-phase d-axis current Id and q-axis current Iq. Values for Id and Iq are calculated by equations as follows.

$$Id = \sqrt{\frac{2}{3}} \ \left(\cos(\theta) \cdot Iu + \cos\left(\theta - \frac{2}{3}\pi\right) \cdot Iv + \cos\left(\theta + \frac{2}{3}\pi\right) \cdot Iw\right) \quad \text{[Equation 2]}$$

$$Iq = \sqrt{\frac{2}{3}} \ \left(-\sin(\theta) \cdot Iu - \sin\left(\theta - \frac{2}{3}\pi\right) \cdot Iv - \sin\left(\theta + \frac{2}{3}\pi\right) \cdot Iw\right)$$

The rotational angle $\theta$ that has been calculated by the angle and rotating speed calculating unit 16 is provided to the two-phase to three-phase transformation unit 11 as well as to the three-phase to two-phase transformation unit 17. Further, the rotating speed $\omega$ that has been calculated by the angle and rotating speed calculating unit 16 is provided to the field weakening control unit 5 as well as to the decoupling control unit 10. The d-axis current Id outputted from the three-phase to two-phase transformation unit 17 is provided to the computing unit 7 as well as to the decoupling control unit 10, as described above. The q-axis current Iq outputted from the three-phase to two-phase transformation unit 17 is provided to the computing unit 6 as well as to the decoupling control unit 10, as described above.

In the above configuration, the assisting amount calculation unit 1, the differentiating circuit 3, and the computing unit 4 constitute a command value calculation device according to one or more embodiments of the present invention. The field weakening control unit 5 constitutes a magnetic field control device according to one or more embodiments of the present invention, and the PWM driving unit 12 constitutes a motor drive device according to one or more embodiments of the present invention. In addition, blocks 1 to 12, 16, and 17 in FIG. 1 constitute a controller 31 in FIG. 11.

Figure 3:
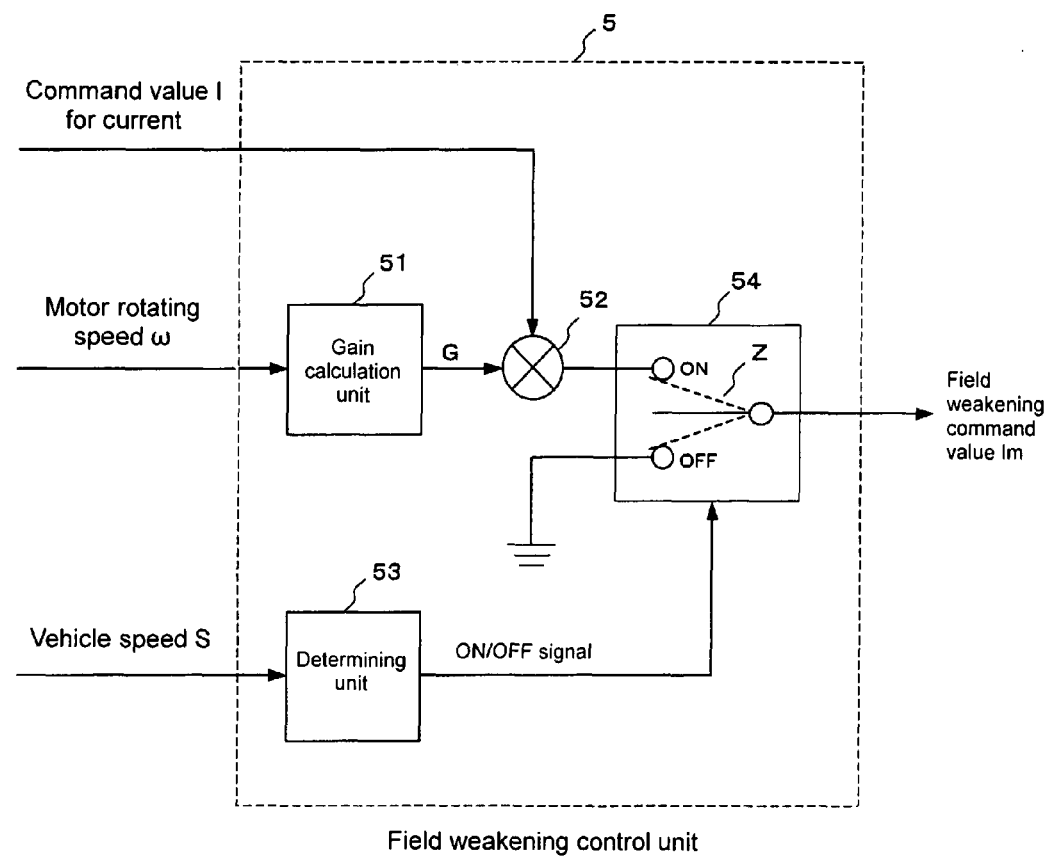
FIG. 3 shows a block diagram of a specific configuration of a field weakening control unit.
Figure 4:
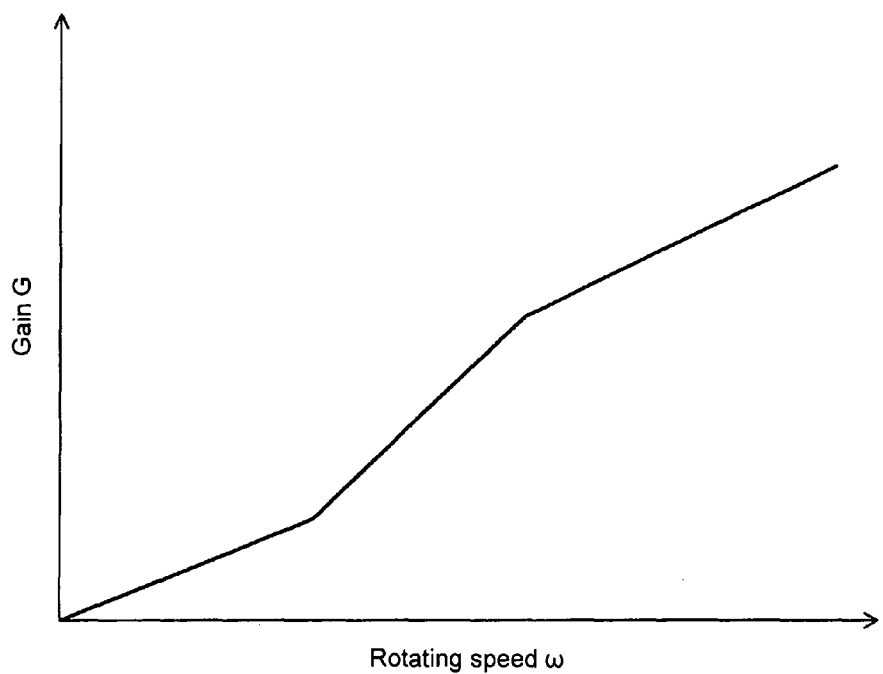
FIG. 4 shows a diagram illustrating a gain table.

FIG. 3 shows a block diagram of a specific configuration of the field weakening control unit 5. A reference numeral 51 indicates a gain calculation unit that calculates a gain corresponding to the rotating speed $\omega$ of the motor 14. The gain calculation unit 51 is provided with a gain table as shown in FIG. 4, and calculates a gain G corresponding to the rotating speed $\omega$ with reference to the gain table based on the rotating speed $\omega$ calculated by the angle and rotating speed calculating unit 16. Values for the gain in the gain table are obtained in an experiment so that the field weakening command value is optimum. A reference numeral 52 indicates a multiplier that multiplies the command value I for torque current outputted from the computing unit 4 based on the calculation by the equation (1) with the gain G calculated by the gain calculation unit 51, and outputs a result of the multiplication as the field weakening command value Im. Thus, the field weakening command value Im is expressed as follows.

$$Im = G \cdot I = G \cdot \{A + (dT/dt)\} \quad (2)$$

Figure 5:
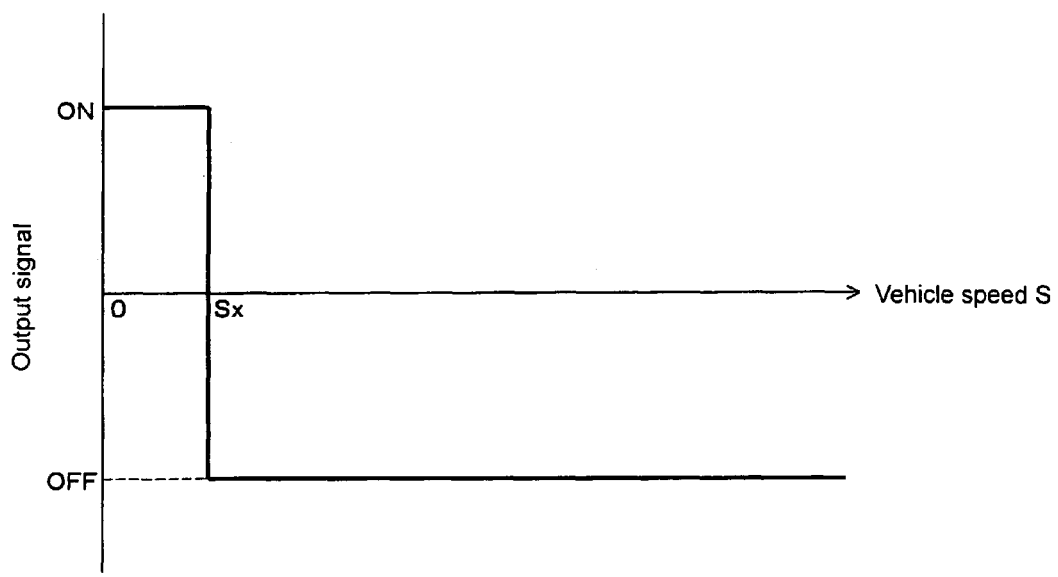
FIG. 5 shows a diagram illustrating an output signal from a determining unit.

A reference numeral 53 indicates a determining unit that determines whether the vehicle speed S inputted from the vehicle speed sensor 28 (FIG. 11) is less than a threshold value or not, and outputs either an ON signal or an OFF signal depending on a result of the determination. As shown in FIG. 5, the determining unit 53 outputs the ON signal when the vehicle speed S is less than a threshold value Sx, and outputs the OFF signal when the vehicle speed S is not less than the threshold value Sx. The threshold value Sx is previously stored in the determining unit 53 as a predetermined value. A reference numeral 54 indicates a switching unit that switches an output from the field weakening control unit 5 based on the ON or OFF signal from the determining unit 53. The switching unit 54 switches a switch Z to an ON side when supplied with the ON signal from the determining unit 53, and to an OFF side when supplied with the OFF signal from the determining unit 53. The ON side of the switch Z is connected to the multiplier 52, and the OFF side of the switch Z is grounded.

In the above configuration, the gain calculation unit 51 and the multiplier 52 constitute a calculation device according to one or more embodiments of the present invention, the determining unit 53 constitutes a determination device according to one or more embodiments of the present invention, and the switching unit 54 constitutes an output switching device according to one or more embodiments of the present invention.

Figure 6:
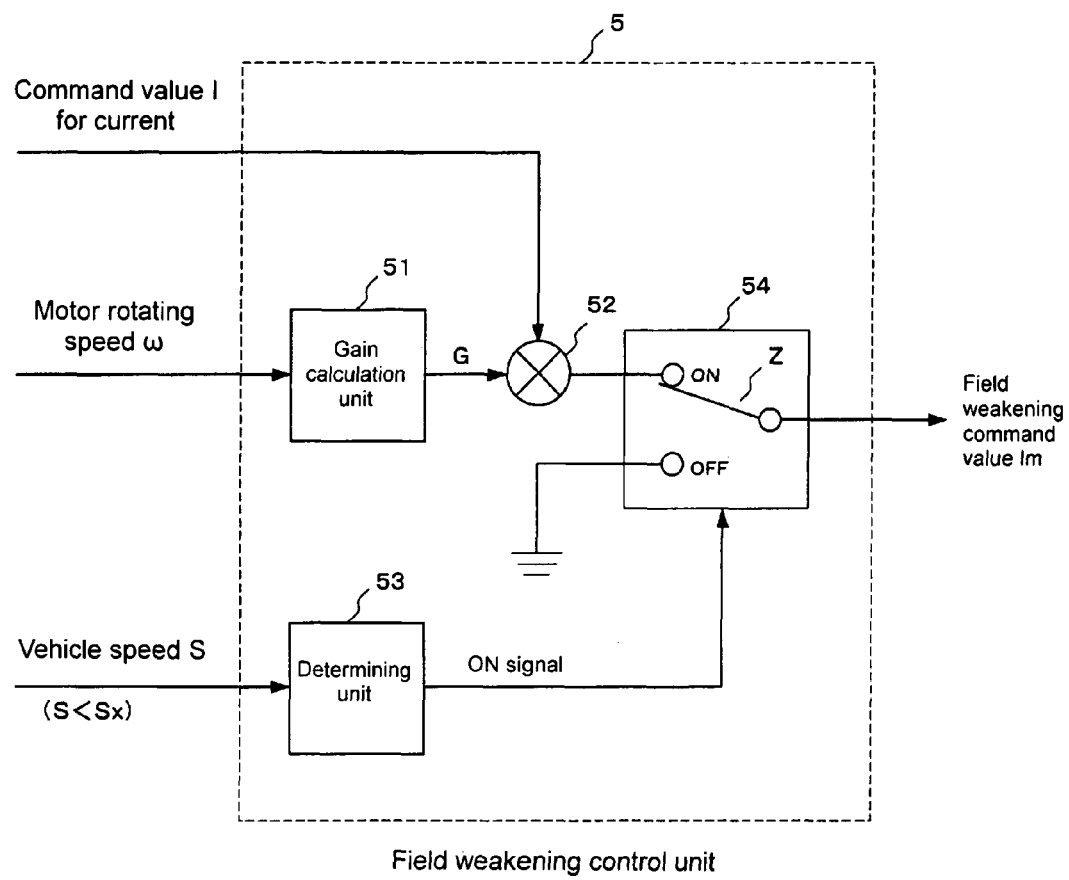
FIG. 6 shows a diagram illustrating an operation of the field weakening control unit.
Figure 7:
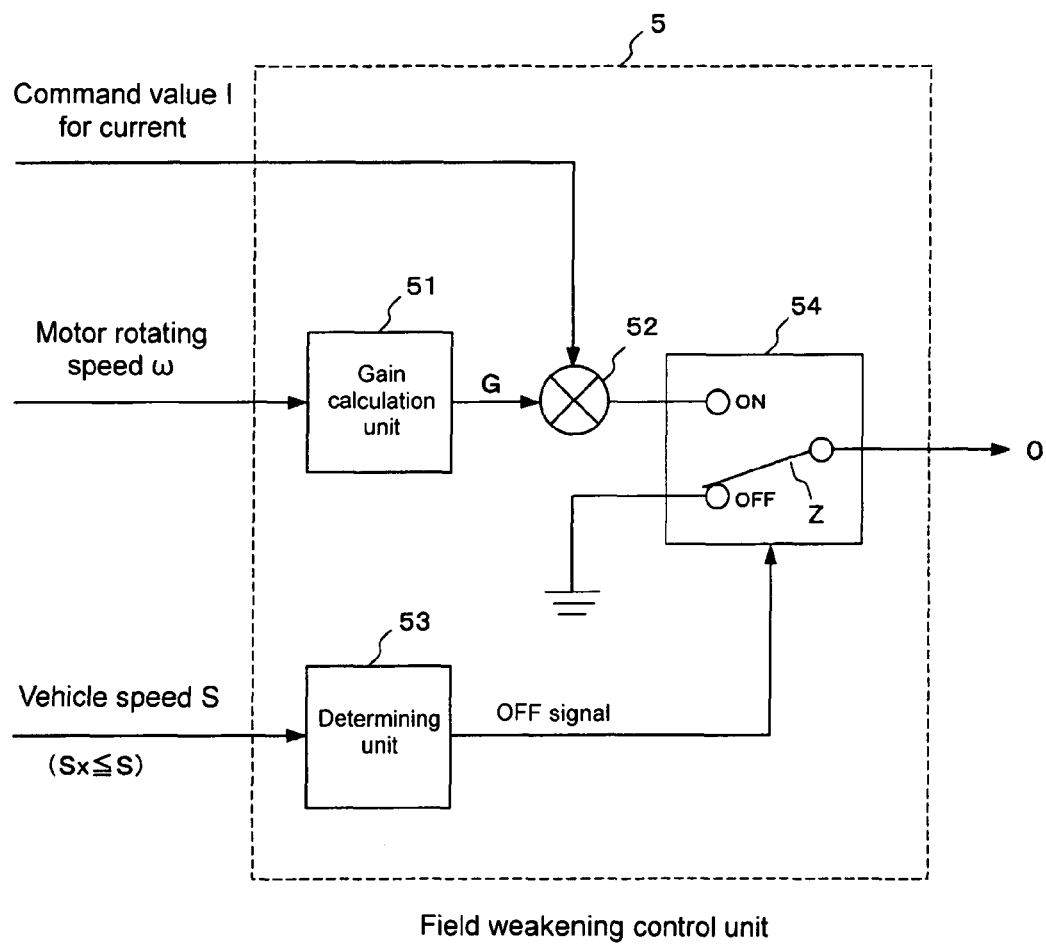
FIG. 7 shows a diagram illustrating an operation of the field weakening control unit.

When the vehicle speed S is less than the threshold value Sx (S<Sx), as shown in FIG. 6, the ON signal is outputted from the determining unit 53, and the switch Z of the switching unit 54 is switched to the ON side. Thus, the field weakening control unit 5 outputs an output from the multiplier 52, that is, the field weakening command value Im calculated by the equation (2). On the other hand, when the vehicle speed S is not less than the threshold value Sx (Sx=<S), as shown in FIG. 7, the OFF signal is outputted from the determining unit 53, and the switch Z of the switching unit 54 is switched to the OFF side. Thus, the field weakening control unit 5 fails to output the field weakening command value Im and a value to be outputted becomes zero. In this manner, the field weakening control unit 5 outputs the field weakening command value Im to perform the field weakening control only when the vehicle speed S is less than the threshold value Sx.

The field weakening command value Im outputted from the field weakening control unit 5 is provided to the computing unit 7 shown in FIG. 1, and the deviation with the d-axis current Id is calculated. Further, in parallel to this calculation, the command value I for torque current is supplied to the computing unit 6 and the deviation with the q-axis current Iq is calculated. Here, the d-axis current Id obtained by transforming the three-phase currents Iu, Iv, and Iw into two-phase corresponds to field current of the motor 14, and the q-axis current Iq corresponds to a torque current of the motor 14. These deviations are inputted to the proportional integral circuits 8 and 9, and a feedback control is performed so that the both deviation are eliminated, that is, so that the q-axis current Iq becomes equal to the command value I for torque current and the d-axis current Id becomes equal to the field weakening command value Im. Circuits succeeding the proportional integral circuits 8 and 9 are well-known, as described in Japanese Patent Application Laid-Open No. 2003-40128 and Japanese Patent Application Laid-Open No. 2004-40883. Therefore, detailed descriptions of these circuits are not given.

Figure 8A:
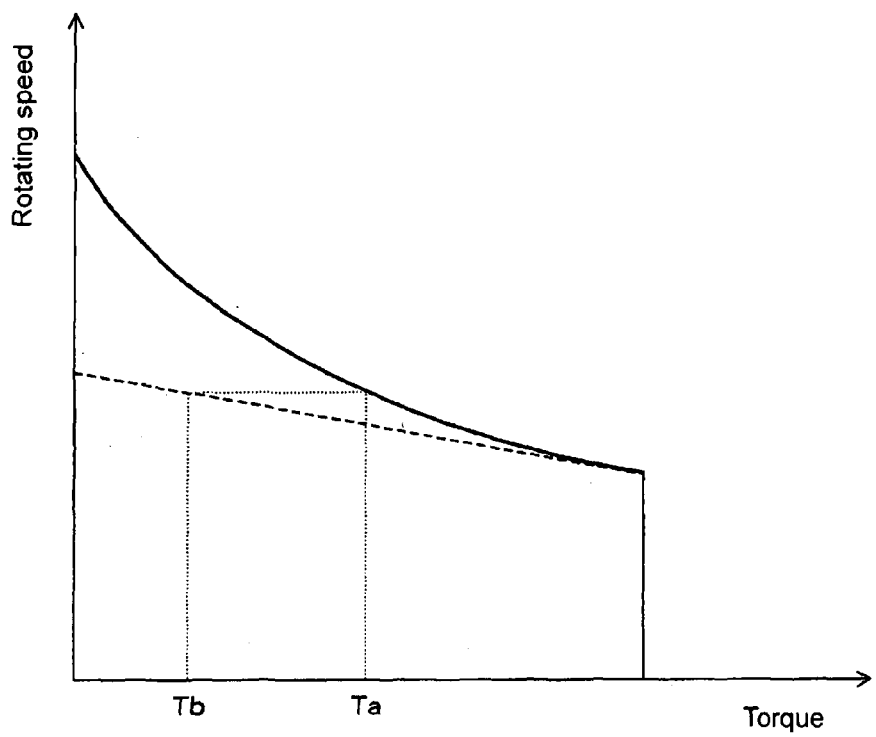
FIG. 8 shows a diagram illustrating output characteristics of a motor.
Figure 13:
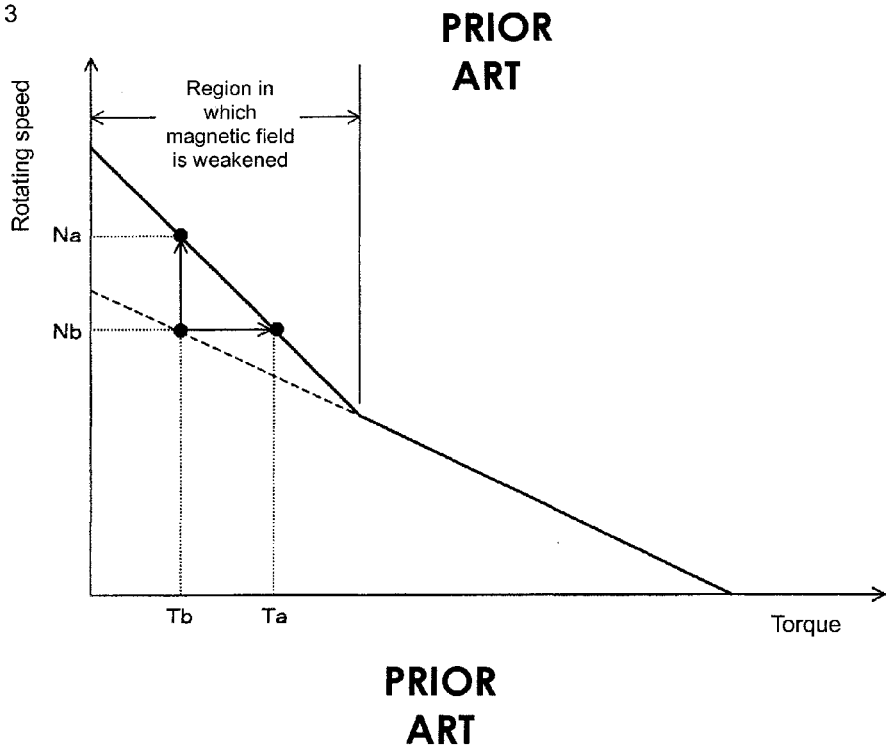
FIG. 13 shows an example of the characteristics of the motor when a field weakening control is performed.
Figure 14:
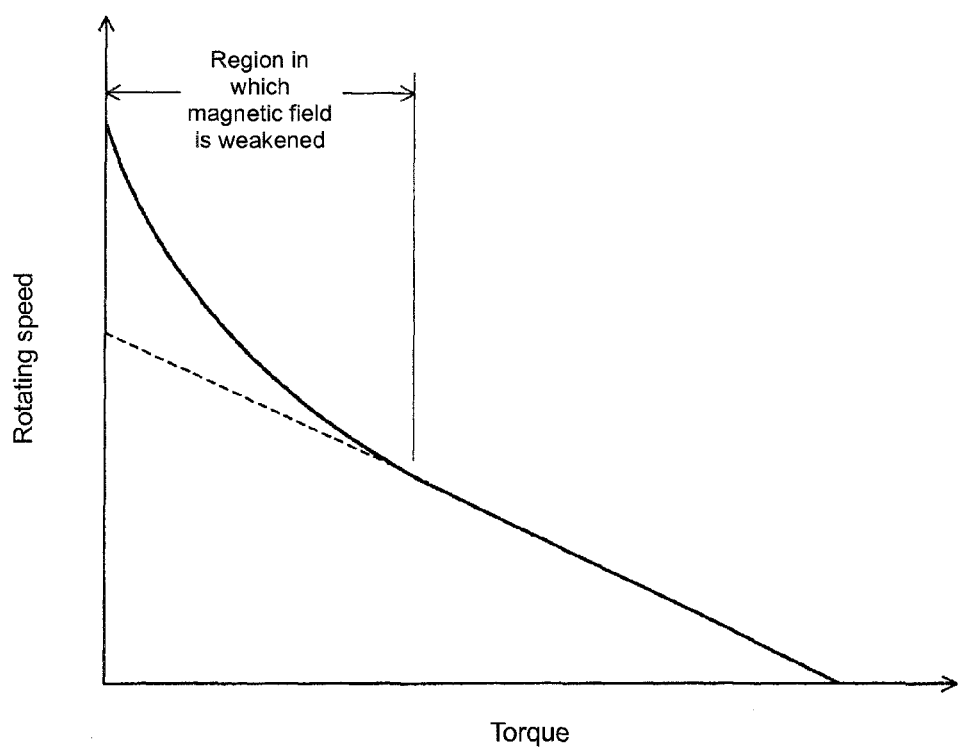
FIG. 14 shows a diagram illustrating nonlinearization of the output characteristics of a motor due to field weakening control.

When the vehicle is parked, the vehicle speed S is less than the threshold value Sx, which brings the field weakening control unit 5 into a state as shown in FIG. 6. Accordingly, based on the field weakening command value Im outputted from the field weakening control unit 5, a control is performed so that the d-axis current Id flows through the motor 14 to weaken the magnetic field. As a result, the motor 14 exhibits a characteristic as an effect of the field weakening control, that is, an improvement in the characteristic of the motor output in a small region of the torque as shown by a solid line in FIG. 8A. Therefore, based on a similar idea as described with reference to FIG. 13, the torque can be maintained larger than a case in which the field weakening control is not performed (shown by a dashed line) (Tb<Ta). It should be noted that while the exhibited motor characteristics is nonlinear as a result of the effect of the field weakening control as shown in FIG. 8A, the steering feeling is not a big problem when steering while the vehicle is parked, unlike when the vehicle is driving. Therefore, there is any notable adverse effect in nonlinearization. Although the case when the vehicle is parked is described above, the same applies to a case in which the vehicle drives very slowly.

Figure 8B:
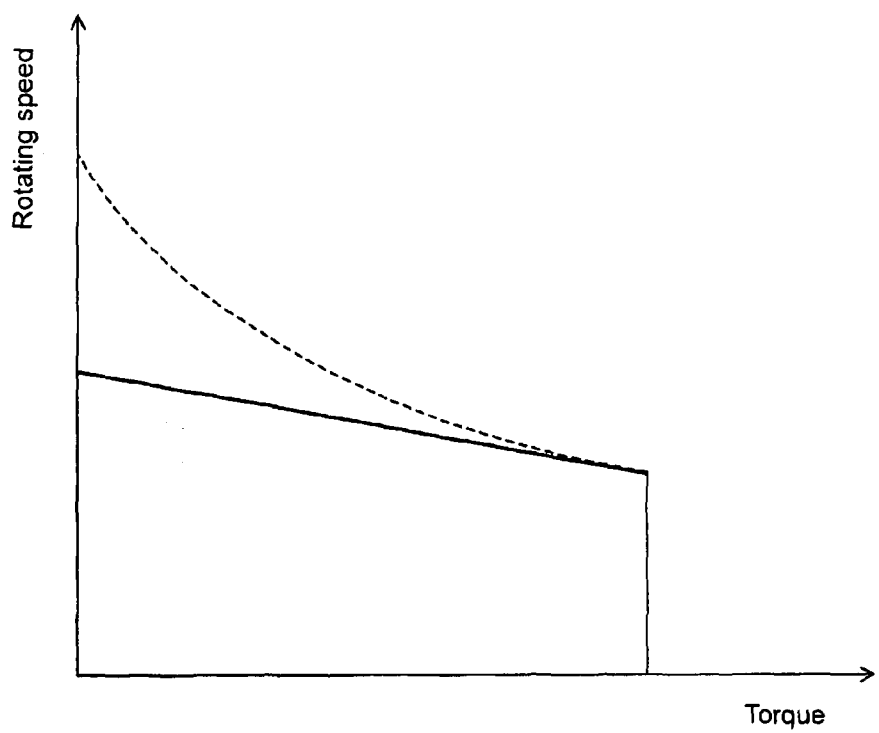

On the other hand, when the vehicle drives normally, the vehicle speed S is not less than the threshold value Sx, which brings the field weakening control unit 5 into a state as shown in FIG. 7. Specifically, the field weakening command value Im is not outputted from the field weakening control unit 5. As a result, the motor 14 exhibits a characteristic where the field weakening control is not performed as shown by a solid line in FIG. 8B. This makes the motor characteristics linear, and the torque current corresponding to the command value I for torque current is fed to the motor 14. Consequently, it is possible to obtain a motor output as the command value, and to provide favorable steering feeling. Although the motor output in FIG. 8B is reduced compared to the case in which the field weakening control is performed, this does not affect much because a torque required for assisting while the vehicle drives is not as large as that required while the vehicle is parked.

According to the above described embodiment, the field weakening control by the field weakening control unit 5 is performed only when the vehicle speed S is less than the threshold value Sx. When the vehicle speed S is not less than the threshold value Sx, the field weakening control by the field weakening control unit 5 is not performed. As a result, the motor characteristics is maintained linear as shown in FIG. 8B for the steering while the vehicle is driving, and the motor output according to the command value can be obtained. Accordingly, it is possible to avoid deterioration of the steering feeling when steering while the vehicle is driving. On the other hand, when the vehicle is parked or drives very slowly, the field weakening control is performed to obtain the required torque as shown in FIG. 8A, thereby providing a sufficient assisting force.

Figure 9:
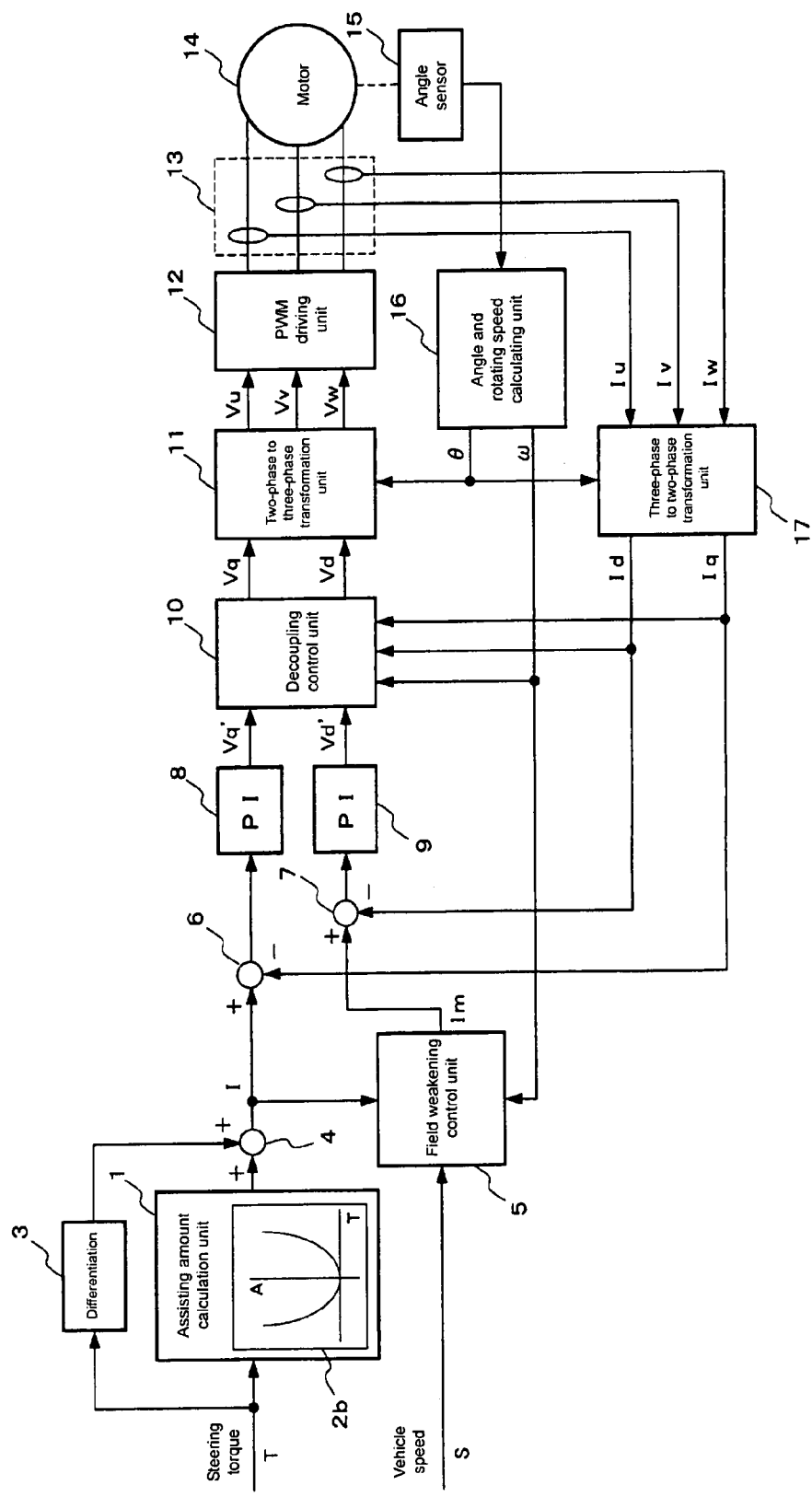
FIG. 9 shows a block diagram of the electric power steering control apparatus according to another embodiment of the present invention.
Figure 10:
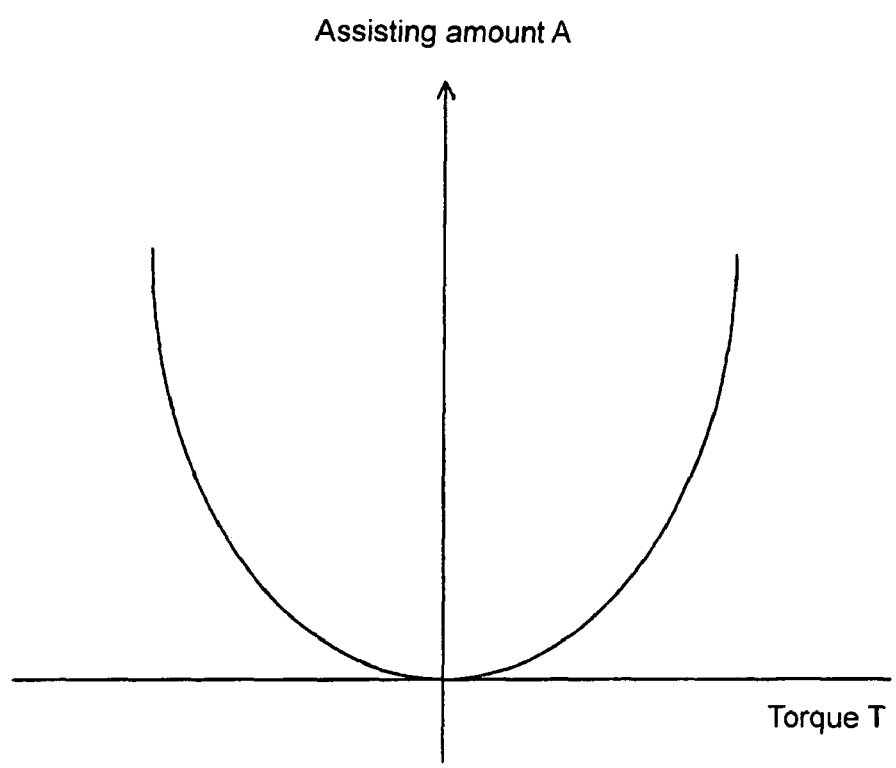
FIG. 10 shows another example of the table for the amount of assisting force.

FIG. 9 shows a block diagram of the electric power steering control apparatus according to another embodiment of the present invention. In FIG. 9, identical components as in FIG. 1 are indicated by identical reference numerals. In the embodiment of FIG. 1, the assisting amount calculation unit 1 calculates the assisting amount A based on the steering torque T and the vehicle speed S. However, in an embodiment of FIG. 9, the assisting amount calculation unit 1 calculates the assisting amount A based only on the steering torque T. Consequently, the assisting amount table 2b provided for the assisting amount calculation unit 1 is such that only a single assisting amount for the torque is stored as shown in FIG. 10 without setting the vehicle speed as a parameter. Other configuration is the same as the example shown in FIG. 1, and the configuration and the operation of the field weakening control unit 5 are also the same as those shown in FIG. 3 to FIG. 7.

Also in the embodiment of FIG. 9, the field weakening control is performed only when the vehicle speed S is less than the threshold value Sx. Accordingly, it is possible to maintain the steering feeling for a steering while the vehicle drives, as well as to obtain the assisting force for the steering while the vehicle is parked or drives very slowly.

In the above described embodiment, the threshold value Sx in the field weakening control unit 5 is set to be 0<Sx as shown in FIG. 5, and the field weakening control is performed not only while the vehicle is parked but also while the vehicle drives very slowly. However, the threshold value Sx may be set so as to be Sx=0. In this case, the field weakening control works only when the vehicle is completely at halt.

In the above described embodiment, an example in which a brushless motor is used as the motor 14 for the electric power steering apparatus. However, it is possible to use other types of motors such as a motor with a brush. Further, in the above described embodiment, an example is explained in which the PWM driving unit 12 is provided as a motor driving unit and the motor 14 is driven by the PWM signal. However, a method other than PWM can be employed for driving a motor.

What is claimed is:

1. An electric power steering control apparatus for controlling a motor that provides an assisting force for steering a steering wheel, the apparatus comprising:
   a command value calculation device operable to calculate a command value for a torque current to be fed to the motor based on a steering torque of the steering wheel;
   a magnetic field control device operable to control intensity of a magnetic field in the motor; and
   a motor drive device operable to drive the motor based on outputs from the command value calculation device and the magnetic field control device, wherein
      the magnetic field control device is operable to perform a field weakening control for weakening the magnetic field in the motor when a vehicle speed is less than a predetermined value, and to not perform the field weakening control when the vehicle speed is not less than the predetermined value.

2. The electric power steering control apparatus according to claim 1, wherein
   the command value calculation device is operable to calculate an assisting amount corresponding to the steering torque based on the steering torque of the steering wheel, to calculate a differential value of the steering torque, and to add the assisting amount and the differential value to be outputted as the command value for the torque current, and
   the magnetic field control device is operable to output a field weakening command value based on the torque current command value outputted from the command value calculation device and a rotating speed of the motor when the vehicle speed is less than the predetermined value, and to not output the field weakening command value when the vehicle speed is not less than the predetermined value, the field weakening command value being for performing the field weakening control.

3. The electric power steering control apparatus according to claim 1, wherein the magnetic field control device comprises:
   a determination device operable to determine whether or not the vehicle speed is less than the predetermined value;
   a calculation device operable to compute a field weakening command value based on the torque current command value calculated by the command value calculation device and a rotating speed of the motor, the field weakening command value being for performing the field weakening control; and
   an output switching device operable to switch between outputting the field weakening command value calculated by the calculation device when the determination device determines that the vehicle speed is less than the predetermined value, and not outputting the field weakening command value calculated by the calculation device when the determination device determines that the vehicle speed is not less than the predetermined value.

* * * * *